US012586715B2

(12) United States Patent
Fujimaki

(10) Patent No.: US 12,586,715 B2
(45) Date of Patent: Mar. 24, 2026

(54) COIL COMPONENT

(71) Applicant: SUMIDA CORPORATION, Tokyo (JP)

(72) Inventor: Takanari Fujimaki, Natori City (JP)

(73) Assignee: SUMIDA CORPORATION (JP)

( * ) Notice: Subject to any disclaimer, the term of this patent is extended or adjusted under 35 U.S.C. 154(b) by 966 days.

(21) Appl. No.: 17/720,358

(22) Filed: Apr. 14, 2022

(65) Prior Publication Data

US 2022/0351896 A1 Nov. 3, 2022

(30) Foreign Application Priority Data

Apr. 28, 2021 (JP) ................................ 2021-075996

(51) Int. Cl.

| | |
|---|---|
| ***H01F 27/32*** | (2006.01) |
| ***H01F 27/02*** | (2006.01) |
| ***H01F 27/24*** | (2006.01) |
| ***H01F 27/28*** | (2006.01) |

(52) U.S. Cl.

CPC ........... *H01F 27/325* (2013.01); *H01F 27/02* (2013.01); *H01F 27/24* (2013.01); *H01F 27/2823* (2013.01)

(58) Field of Classification Search

CPC .... H01F 27/325; H01F 27/24; H01F 27/2823; H01F 27/303; H01F 27/306; H01F 2005/046; H01F 27/292; H01F 27/2828; H01F 27/06; H01F 27/29

See application file for complete search history.

(56) References Cited

U.S. PATENT DOCUMENTS

2002/0067232 A1 6/2002 Oshima et al.
2011/0043315 A1* 2/2011 Kobayashi ............ H01F 27/325 29/606
2017/0011844 A1 1/2017 Mikogami et al.
2017/0294265 A1* 10/2017 Hatakeyama ......... H01F 27/306

(Continued)

FOREIGN PATENT DOCUMENTS

JP H05-021421 U 3/1993
JP H08-306555 A 11/1996

(Continued)

OTHER PUBLICATIONS

Partial European Search Report issued in the corresponding European Patent Application No. 22170555.1; dated Oct. 21, 2022 (total 14 pages).

(Continued)

*Primary Examiner* — Mang Tin Bik Lian
(74) *Attorney, Agent, or Firm* — Harness, Dickey & Pierce, P.L.C.

(57) ABSTRACT

A coil component includes: a base member made of a resin, the base member having a bobbin part and a terminal holder; a coil wound around the bobbin part; and a plurality of terminal members made of a metal. The terminal members are held by the terminal holder while being partially embedded therein, and each has the coil electrically connected thereto. A part of each terminal member, which protrudes out from the terminal holder, includes: a mounting terminal part; and a standoff part that is arranged at a position different, in a bottom view, from the mounting terminal part, and exposes to the lower face side of the coil component.

15 Claims, 8 Drawing Sheets

(56) References Cited

U.S. PATENT DOCUMENTS

| | | | | |
|---|---|---|---|---|
| 2019/0080836 | A1* | 3/2019 | Yasuda | H01F 27/29 |
| 2019/0279808 | A1* | 9/2019 | Yasuda | H01F 27/2804 |
| 2020/0313555 | A1* | 10/2020 | DeVries, Jr. | H01F 27/2852 |
| 2021/0249181 | A1* | 8/2021 | Yasuda | H01F 27/263 |
| 2022/0102050 | A1 | 3/2022 | Monma et al. | |
| 2022/0139602 | A1* | 5/2022 | Ishigaki | H01F 27/2828 336/192 |

FOREIGN PATENT DOCUMENTS

| | | | |
|---|---|---|---|
| JP | H09-097727 | A | 4/1997 |
| JP | 2017188595 | A | 10/2017 |
| JP | 2018-182008 | A | 11/2018 |
| JP | 2019-050280 | A | 3/2019 |
| WO | 2020-162334 | A1 | 8/2020 |

OTHER PUBLICATIONS

Office Action issued in the corresponding Japanese Patent Application No. 2021-075996; mailed on Dec. 10, 2024 (total 9 pages).

European Search Report issued in the corresponding European Patent Application No. 22170555.1; dated Feb. 9, 2023 (total 13 pages).

* cited by examiner

COIL COMPONENT

CROSS-REFERENCE TO RELATED APPLICATIONS

This application claims priority to Japanese Patent Application No. 2021-075996, filed Apr. 28, 2021, which is hereby expressly incorporated by reference herein in its entirety.

BACKGROUND OF THE INVENTION

1. Field of the Invention

The present disclosure relates to a coil component.

2. Description of the Related Art

A known coil component is exemplified by the one described in JP-2017-188595A.

The coil component described in JP-2017-188595A has, in its structure, a bobbin part (denoted as "bobbin" in the literature), a coil wound around the bobbin part, a magnetic core (denoted as "core member" in the literature) inserted in the bobbin part, and a plurality of terminal members (denote as "terminal pin" in the literature) made of a metal, to which the coil is electrically connected.

Examination by the present inventors revealed that the core component described in JP-2017-188595A still has some room for improvement, in view of maintenance of shape of the terminal members and performances of the coil component.

SUMMARY

The present disclosure is conceived in consideration of the aforementioned problem, and an object of which is to provide a coil component capable of maintaining shape of the terminal members and performances of the coil component in a more reliable manner.

According to the present disclosure, there is provided a coil component that includes a base member made of a resin, having a bobbin part and a terminal holder; a coil wound around the bobbin part; and a plurality of terminal members made of a metal, being held by the terminal holder while being partially embedded therein, and each having the coil electrically connected thereto, a part of each terminal member, which protrudes out from the terminal holder, includes a mounting terminal part; and a standoff part that is arranged at a position different, in a bottom view, from the mounting terminal part, and exposes to the lower face side of the coil component.

Advantageous Effects of Invention

The present disclosure can maintain shape of the terminal members and performances of the coil component in a more reliable manner.

BRIEF DESCRIPTION OF THE DRAWINGS

FIGS. 7A, 7B, 7C and 7D illustrate terminal members (a pair of first terminal members) in the embodiment, wherein FIG. 7A is a perspective view, FIG. 7B is a front elevation, FIG. 7C is a plan view, and FIG. 7D is a bottom view.

DETAILED DESCRIPTION OF THE PREFERRED EMBODIMENTS

Figure 1:
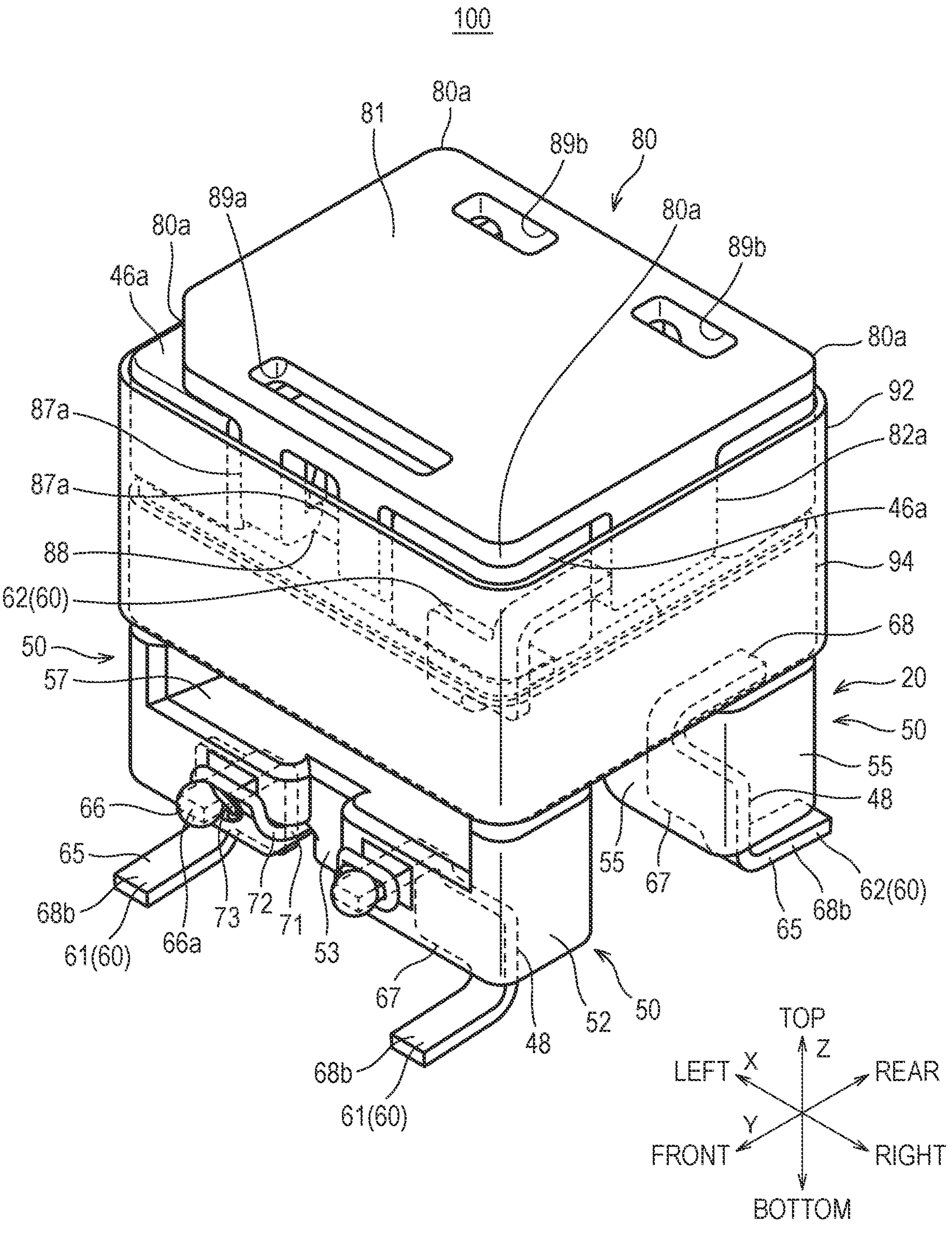
FIG. 1 is a perspective view illustrating a coil component of an embodiment.

An embodiment of the present disclosure will be explained below, referring to FIG. 1 to FIG. 8.

Note that, all similar constituents in all drawings will be given the same reference signs to properly skip the explanation.

As illustrated in any of FIG. 1 to FIG. 7D, a coil component 100 of the embodiment has a base member 20 made of a resin, having a bobbin part 30 and a terminal holder 50; a coil 70 wound around the bobbin part 30; and a plurality of terminal members 60 made of a metal, being held by the terminal holder 50 while being partially embedded therein, and each having the coil 70 electrically connected thereto.

Figure 7A:
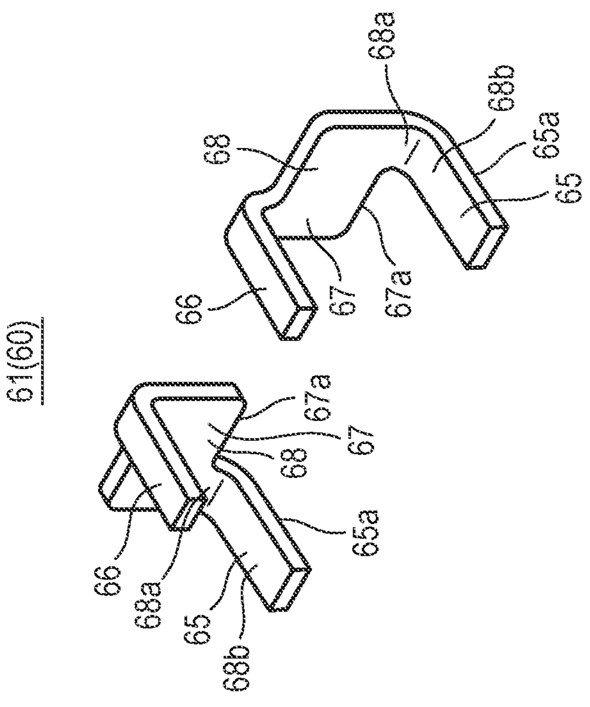
Figure 7B:
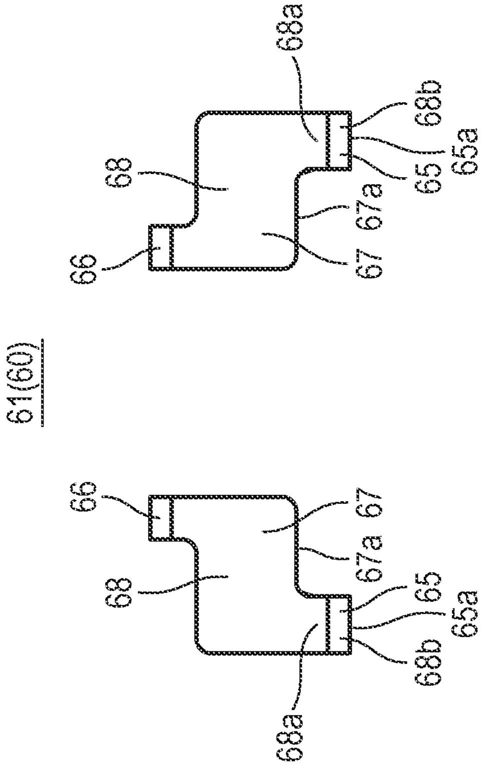
Figure 7C:
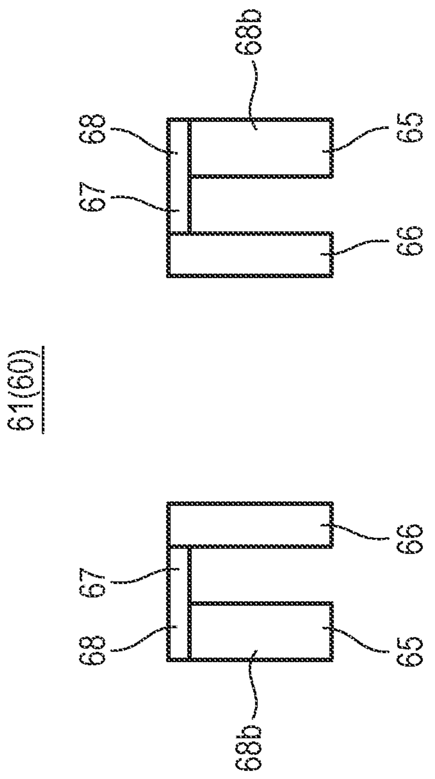
Figure 7D:
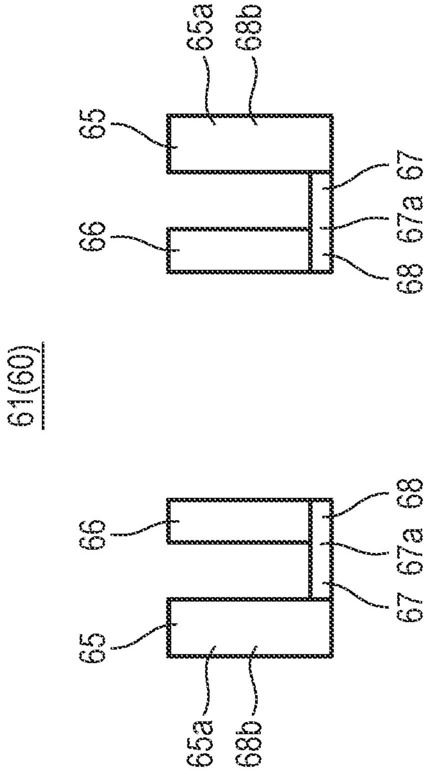

As illustrate in FIG. 7D, a part of each terminal member 60, which protrudes out from the terminal holder 50, includes a mounting terminal part 65; and a standoff part 67 that is arranged at a position different, in a bottom view, from the mounting terminal part 65, and exposes to the lower face side of the coil component 100.

When inspecting electrical characteristics of the coil component 100, tips of contact probes 310 are pressed against the terminal members 60, to apply electric current through the terminal members 60 to the coil component 100.

Each terminal member 60 in this embodiment has the mounting terminal part 65; and the standoff part 67 that is arranged at a position different, in a bottom view, from the mounting terminal part 65, and exposes to the lower face side of the coil component 100.

Hence, when inspecting the electrical characteristics, electric current may be applied to the coil component 100, by contacting the contact probes 310 with the standoff part 67. This successfully suppresses, for example, the mounting terminal part 65 from being deformed, which could occur if the contact probes 310 were strongly pressed against the mounting terminal part 65.

Also since electric current may be applied to the coil component 100 without contacting the contact probes 310 with the mounting terminal part 65 which typically has a plated layer (not illustrated) formed thereon with tin or the like, so that the plated layer may be properly maintained. The mounting terminal part 65 may therefore be suppressed from being corroded or producing verdigris typically due to copper exposure, thus properly maintaining performances of the coil component 100.

As described above, this embodiment can maintain shape of the mounting terminal part 65, and consequently the terminal members 60, and performances of the coil component 100 in a more reliable manner.

In the description below, the top-and-bottom direction will be denoted as the Z-direction. The bottom (lower side) corresponds to the side on which the mounting terminal part 65 (see FIG. 1, etc.) described later is arranged, that is, a mounting face side the coil component 100 is mounted. Note, however, that the positional relation of the individual parts during manufacture or use of the coil component 100 (particularly positional relation in the top-and-bottom direction) is not limited to the positional relation in the context of the present patent specification.

The axial direction of the insertion hole 36 lies in the direction orthogonal to the Z-direction. The axial direction of the insertion hole 36 will be denoted as Y-direction, one side of the Y-direction will be denoted as front (front side), and the other side will be denoted as rear (rear side).

The direction orthogonal to both of the Y-direction and the Z-direction will be denoted as X-direction, one side of the X-direction will be denoted as right (right side), and the other side will be denoted as left (left side).

These directions are denoted in the individual drawings.

In the Y-direction, the side the center position in the axial direction of the coil 70 resides will be denoted as internal (inside), and the side opposite to the internal will be denoted as external (outside). Similarly in the X-direction, the side the center position in the left-and-right direction of the coil 70 resides will be denoted as internal (inside), and the side opposite to the internal will be denoted as external (outside).

A directivity (direction) orthogonal to the Z-direction will be denoted as horizontal (horizontal direction), and a directivity (direction) laid along the Z-direction will be denoted as perpendicular (perpendicular direction).

The coil component 100 typically has a magnetic core 10 that is inserted through the bobbin part 30.

The magnetic core 10 in this embodiment typically has a pair of front-and-rear core members, that is, the first magnetic core 11*a* arranged on the front side, and the second magnetic core 11*b* arranged on the rear side.

Figure 2:
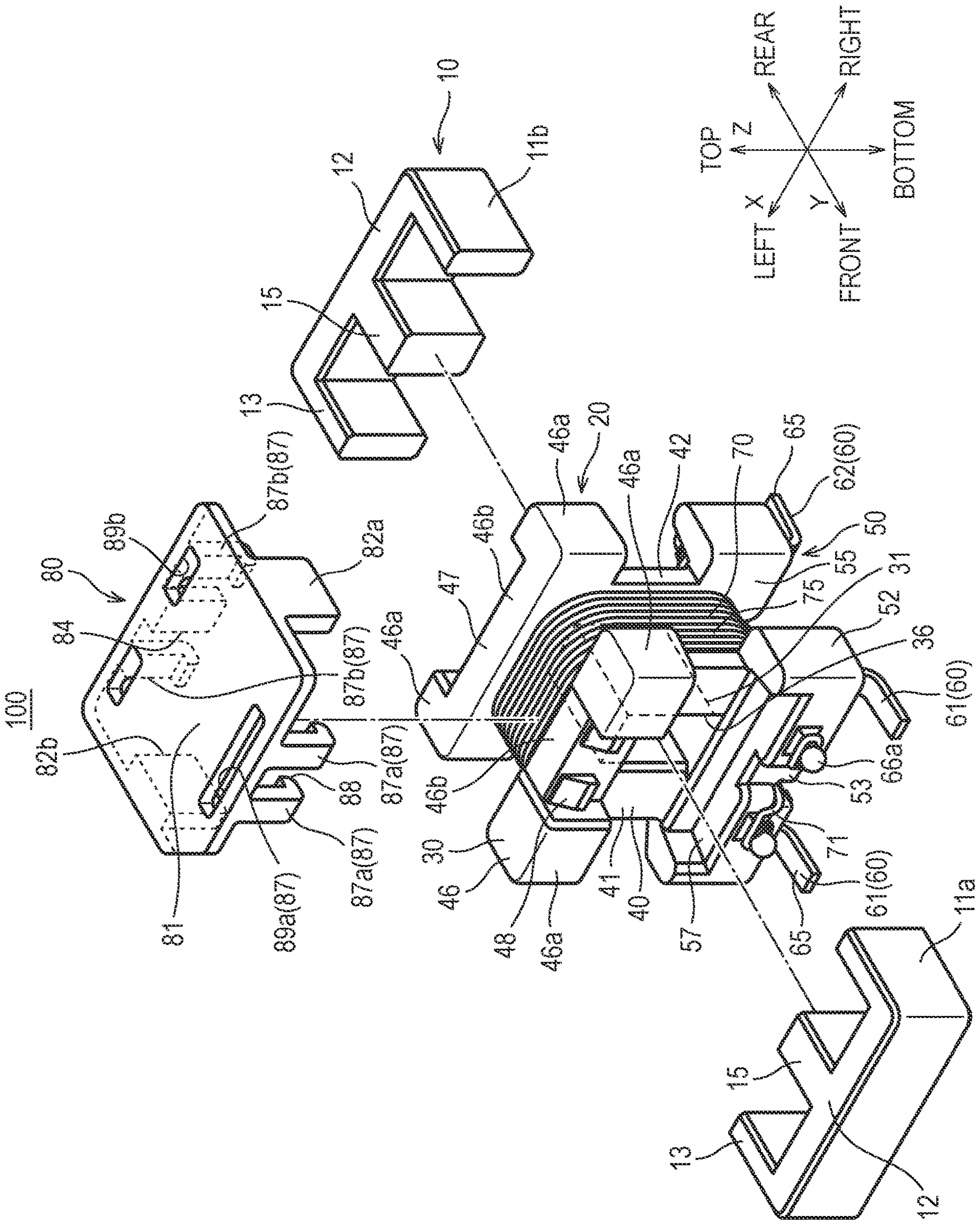
FIG. 2 is an exploded perspective view illustrating the coil component of the embodiment.

In more detail, each of the first magnetic core 11*a* and the second magnetic core 11*b* is typically a so-called E-core, having an E-shape in the plan view (see FIG. 2).

The first magnetic core 11*a* has the base 12 that extends in the left-and-right direction, a pair of outer legs 13 that protrude rearwards individually from both ends of the base 12, and the insertion part 15 that protrude rearwards from a middle part of the base 12. Note that the direction of protrusion of the outer legs 13 and the insertion part 15 from the base 12 is same as the axial direction of the coil 70.

The base 12 typically has a prismatic shape which is long in the left-and-right direction and having a rectangular transverse cross-section taken orthogonally to the axial direction. Of four faces of the base 12 arranged around the axis, two faces constitute the horizontal upper and lower faces, one of the residual two faces (referred to as an inner face, hereinafter) is directed to the bobbin part 30, and the other (referred to as an outer face, hereinafter) is directed to the opposite side of the bobbin part 30. In this embodiment, the inner face of the base 12 constitutes an inside face of the first magnetic core 11*a*, and the outer face of the base 12 constitutes an outside face of the first magnetic core 11*a*.

Each of the outer legs 13 and the insertion part 15 typically has a prismatic shape which is long in the front-and-rear direction and having a rectangular transverse cross-section taken orthogonally to the axial direction. Of four faces of each of the outer legs 13 and the insertion part 15 arranged around the axis, two faces constitute the horizontal upper and lower faces, one of the residual two faces is directed to the right, and the other is directed to the left.

The base 12, the individual outer legs 13 and the insertion part 15 typically have the same dimension in the top-and-bottom direction. In the first magnetic core 11*a*, the upper face of the base 12, the upper faces of the outer legs 13, and the upper face of the insertion part 15 are arranged flush. That is, the entire upper face of the first magnetic core 11*a* is formed flat, and arranged horizontally. Similarly, in the first magnetic core 11*a*, the lower face of the base 12, the lower faces of the outer legs 13, and the lower face of the insertion part 15 are arranged flush. That is, the entire lower face of the first magnetic core 11*a* is formed flat, and arranged horizontally.

As illustrated in FIG. 2, the second magnetic core 11*b* in this embodiment is typically formed in the same shape as the first magnetic core 11*a*. That is, the second magnetic core 11*b* has the base 12, a pair of outer legs 13, and the insertion part 15. The base 12 has the upper face, the lower face, the inner face and the outer face.

The second magnetic core 11*b* is arranged symmetrically with the first magnetic core 11*a* in the front-and-rear direction.

The end faces, in the direction of protrusion, of the individual outer legs 13 of each of the first magnetic core 11*a* and the second magnetic core 11*b* are formed flat, and constitute perpendicular faces orthogonal to the axial direction of the coil 70.

Similarly, the end faces, in the direction of protrusion, of the insertion part 15 of each of the first magnetic core 11*a* and the second magnetic core 11*b* are formed flat, and constitute the perpendicular faces orthogonal to the axial direction of the coil 70.

Also the inner face and the outer face of the base 12 are formed flat, and constitute the perpendicular faces orthogonal to the axial direction of the coil 70. The inside face of the first magnetic core 11*a* and the inside face of the second magnetic core 11*b* are opposed with each other, whereas the outer face of the first magnetic core 11*a* and the outside face of the second magnetic core 11*b* are directed oppositely.

As illustrated in FIG. 2, the bobbin part 30 typically has a cylinder part 31, and a pair of flanges 40 individually provided to both ends of the cylinder part 31.

The cylinder part 31 has a prismatic shape, with the insertion hole 36 formed so as to extend therethrough in the axial direction.

The cylinder part 31 typically has, as illustrated in FIG. 2, an upper wall and a lower wall individually arranged horizontally, and a right sidewall and a left sidewall individually arranged perpendicularly.

For example, the inner space of the insertion hole 36 has a prismatic shape. The top face and the bottom face of the inner circumferential face (bottom inner circumferential face) individually constitute the horizontal faces, and the left side face and the right side face of the inner circumferential face of the insertion hole 36 individually constitute the perpendicular faces.

Figure 3:
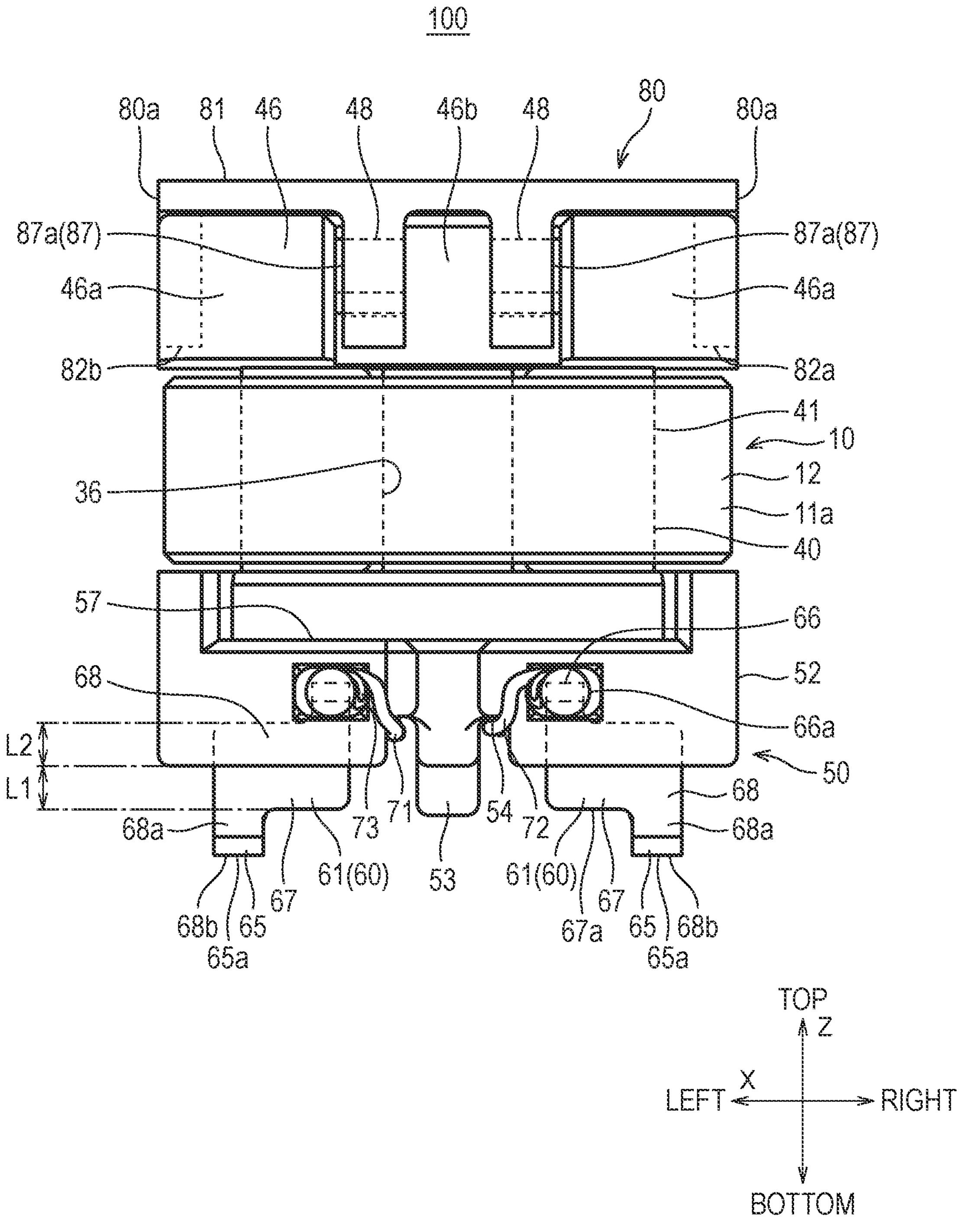
FIG. 3 is a front elevation illustrating the coil component of the embodiment.
Figure 4:
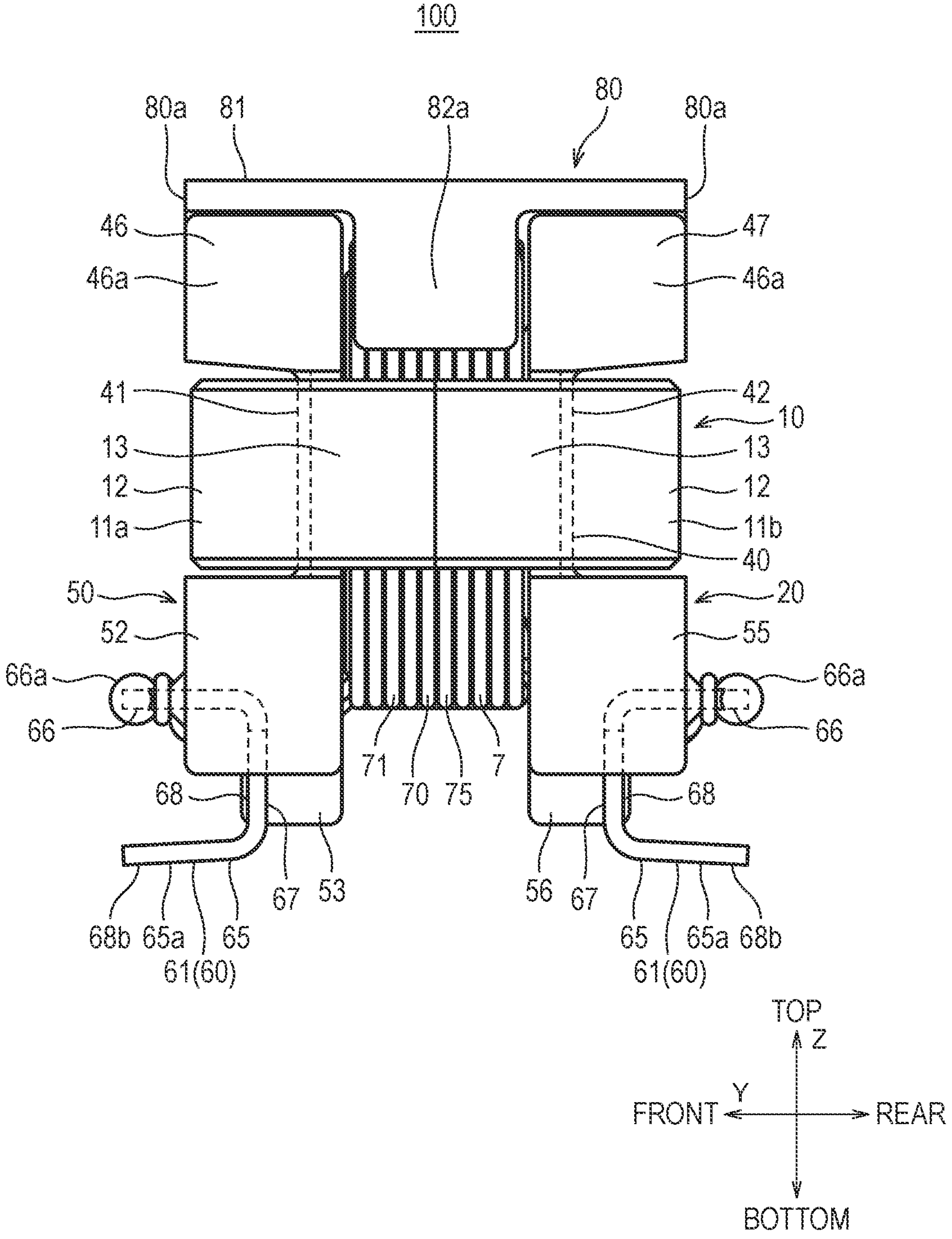
FIG. 4 is a side elevation illustrating the coil component of the embodiment.

As illustrated in FIG. 2, FIG. 3 and FIG. 4, the bobbin part 30 typically has the pair of flanges, that is, a first flange 41 arranged on the front side, and a second flange 42 arranged on the rear side.

Each of the first flange 41 and the second flange 42 typically protrudes from each of both ends of the cylinder part 31, towards the left and the right of the cylinder part 31.

In more detail, each of the first flange 41 and the second flange 42 is typically formed in the shape of flat plate orthogonal to the axial direction of the cylinder part 31.

The front-and-rear dimension (thickness) of the first flange 41 is equivalent to the front-and-rear dimension (thickness) of the second flange 42. The left-and-right dimension of the first flange 41 is equivalent to the left-and-right dimension of the second flange 42, and the top-and-bottom dimension of the first flange 41 is equivalent to the top-and-bottom dimension of the second flange 42.

The right end face of the first flange 41 and the right end face of the second flange 42 are arranged flush, and the left end face of the first flange 41 and the left end face of the second flange 42 are arranged flush.

As illustrated in FIG. 2, the bobbin part 30 further has a first protruded part 46 that protrudes frontwards and also in the left-and-right direction, from the upper edge of the first flange 41.

The first protruded part 46 typically has a pair of left-and-right square block parts 46*a*, and a connection part 46*b* that connects the square block parts 46*a*.

Figure 5:
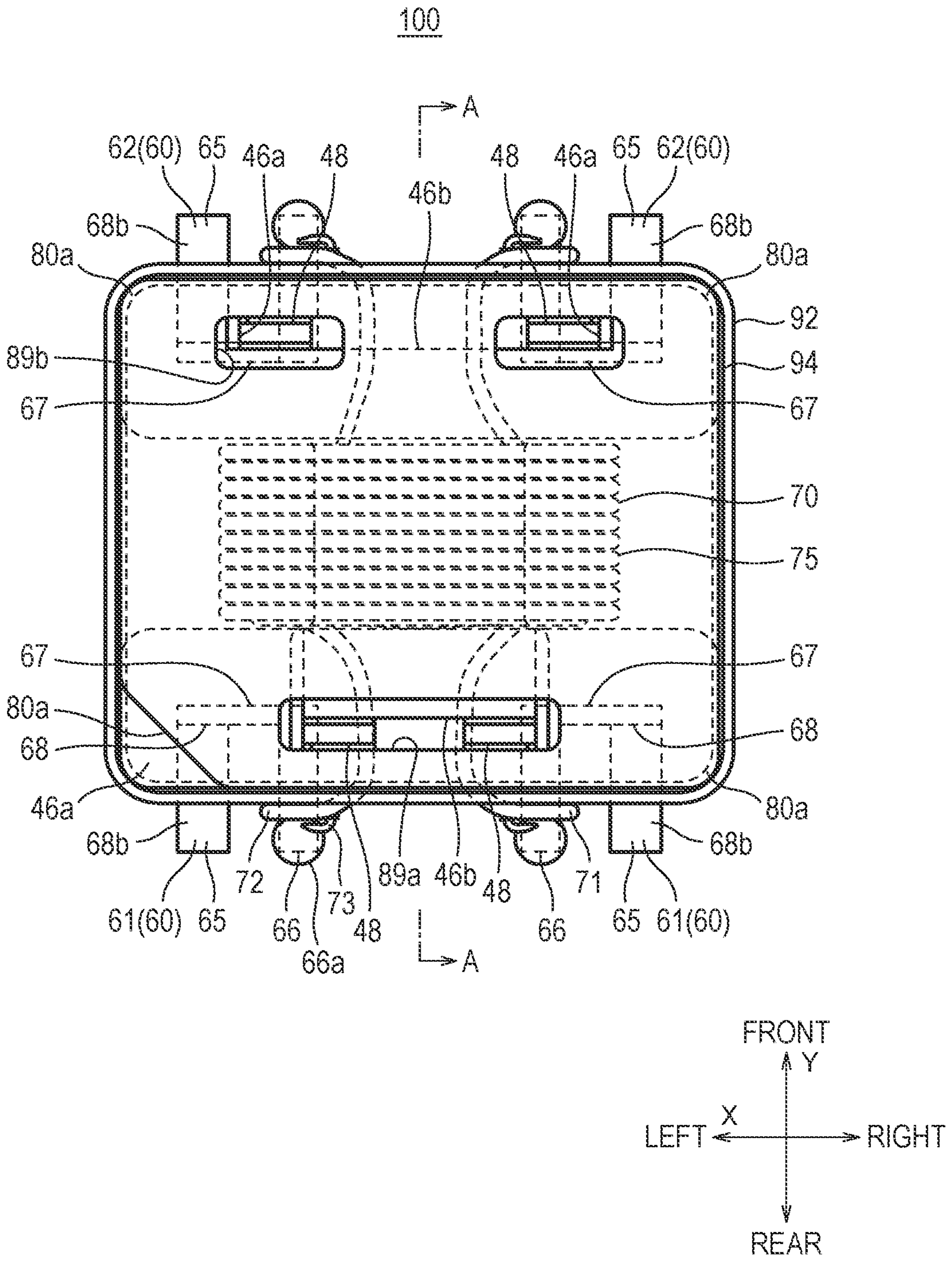
FIG. 5 is a plan view illustrating the coil component of the embodiment.

Each of the pair of left-and-right square block parts 46*a* is formed in the shape of near-rectangular parallelopiped. As illustrated in FIG. 5, the right square block part 46*a* protrudes rightwards beyond the right end face of the first flange 41, meanwhile the left square block part 46*a* protrudes leftwards beyond the left end face of the first flange 41.

The front face of each of the pair of left-and-right square block parts 46*a* is arranged on the front side of the front face of the first flange 41. The rear face of each of the pair of left-and-right square block parts 46*a* is arranged flush with the rear face of the first flange 41.

The connection part 46*b* is typically formed in the shape of near-rectangular parallelopiped which is oblong in the left-and-right direction. The right end of the connection part 46*b* is connected to the right square block part 46*a*, meanwhile the left end of the connection part 46*b* is connected to the left square block part 46*a*.

The front face of the connection part 46*b* is arranged on the front side of the front face of the first flange 41, and, on the rear side of the front face of the pair of left-and-right square block parts 46*a*. The rear face of the connection part 46*b* is arranged flush with the rear face of the first flange 41.

The top face of the connection part 46*b* is arranged slightly below the top faces of the pair of left-and-right square block parts 46*a*.

Similarly as illustrated in FIG. 2 and FIG. 5, the bobbin part 30 has a second protruded part 47 that protrudes frontwards and also in the left-and-right direction, from the upper edge of the second flange 42.

Like the first protruded part 46, also the second protruded part 47 typically has the pair of left-and-right square block parts 46*a*, and the connection part 46*b* that connects the square block parts 46*a*.

Note, however as illustrated in FIG. 5, that the dimension in the left-and-right direction of the connection part 46*b* of the second protruded part 47 is set larger than the dimension of the connection part 46*b* of the first protruded part 46. The dimension in the left-and-right direction of the individual square block parts 46*a* of the second protruded part 47 is set smaller than the dimension of the individual square block parts 46*a* of the first protruded part 46. The upper face of the individual square block parts 46*a* of the second protruded part 47 are arranged flush with the upper face of the connection part 46*b* of the second protruded part 47.

The right end face of the right square block part 46*a* of the second protruded part 47 is arranged flush with the right end face of the right square block part 46*a* of the first protruded part 46. Similarly, the left end face of the left square block part 46*a* of the second protruded part 47 is arranged flush with the left end face of the left square block part 46*a* of first protruded part 46.

As illustrated in FIG. 2, FIGS. 3 and 4, the base member 20 has, as the terminal holder 50, a first terminal holder 52 arranged on the front side, and a second terminal holder 55 arranged on the rear side.

Each of the first terminal holder 52 and the second terminal holder 55 typically has a flat prismatic shape, which is long in the left-and-right direction, and has the front-and-rear dimension smaller than the top-and-bottom dimension.

The first terminal holder 52 protrudes frontwards and also in the left-and-right direction, from the lower edge of the first flange 41. The second terminal holder 55 protrudes rearwards and also in the left-and-right direction, from the lower edge of the second flange 42.

Each of the first terminal holder 52 and the second terminal holder 55 has, formed on the upper face thereof, a recess 57 that recesses downwards. The recess 57 of the first terminal holder 52 opens frontwards, meanwhile the recess 57 of the second terminal holder 55 opens rearwards.

In this embodiment, the front-and-rear dimension of the first terminal holder 52 is equivalent to the front-and-rear dimension of the second terminal holder 55. The top-and-bottom dimension of the first terminal holder 52 is equivalent to that of the second terminal holder 55. The left-and-right dimension of the first terminal holder 52 is equivalent to the left-and-right dimension of the second terminal holder 55.

Note, that dimensional relation between the first terminal holder 52 and the second terminal holder 55 is not specifically limited. The first terminal holder 52 and the second terminal holder 55 may have different dimensions.

The terminal holder 50 in this embodiment further has a first extended part 53 that extends downwards from a center part in the left-and-right direction of the first terminal holder 52, and a second extended part 56 that extends downwards from a center part in the left-and-right direction of the second terminal holder 55.

In more detail, at the center part in the left-and-right direction of the first terminal holder 52, there is formed a notched part 54 that opens downwards and also in the front-and-rear direction. The first extended part 53 is formed in a region of the first terminal holder 52, where the notched part 54 is formed.

Similarly, at the center part in the left-and-right direction of the second terminal holder 55, there is formed a notched part 54 that opens downwards and also in the front-and-rear direction. The second extended part 56 is formed in a region of the second terminal holder 55, where the notched part 54 is formed.

The lower face of each of the first extended part 53 and the second extended part 56 is formed flat, and arranged horizontally.

The lower faces of the first extended part 53 and the second extended part 56 are arranged at an equivalent level of height in the top-and-bottom direction.

The lower faces of the first extended part 53 and the second extended part 56 are arranged below the lower faces of the first terminal holder 52 and the second terminal holder 55. In more detail, the lower face of the terminal holder 50 in this embodiment is constituted of the lower faces of the first extended part 53 and the second extended part 56.

As descried previously, the coil component 100 has a plurality of (four, for example) terminal members 60 made of a metal, which are electrically connected to the coil 70.

Each terminal member 60 is formed by bending a plate-like metal member. The individual terminal members 60 are formed in the same shape.

In more detail, the terminal member 60 typically has an upright plate part 68 that stands upright relative to a mounting face.

In this embodiment, at least a part of the upright plate part 68, arranged at a position different, in a bottom view, from the mounting terminal part 65 constitutes the standoff part 67. At least a part of the lower end face of the upright plate part 68 constitutes the lower face 67*a* of the standoff part 67.

Hence, when applying electric current to the coil 70, the contact probes 310 may be contacted selectively to the standoff part 67, out of the mounting terminal part 65 and the standoff part 67. This properly maintains shape of the mounting terminal part 65 and performances of the coil component 100.

In addition, the terminal member 60 typically has an L-shaped part that contains a down-extended part 68*a* that extends downwards from the upright plate part 69, and a horizontally extended part 68*b* that extends nearly horizontally from a lower end part of the down-extended part 68*a*, and the horizontally extended part 68*b* constitutes the mounting terminal part 65.

Hence, when applying electric current to the coil 70, the contact probes 310 may be contacted selectively to the standoff part 67, out of the mounting terminal part 65 and the standoff part 67, in a more reliable manner.

Now, the lower face 67*a* of the standoff part 67 is preferably arranged at a level of height higher than the lower face 65*a* of the mounting terminal part 65.

With this design, when applying electric current to the coil 70, the contact probes 310 may be contacted selectively to the standoff part 67, out of the mounting terminal part 65 and the standoff part 67, in a more reliable manner.

The lower face 67*a* of the standoff part 67 is preferably arranged horizontally.

Figure 8:
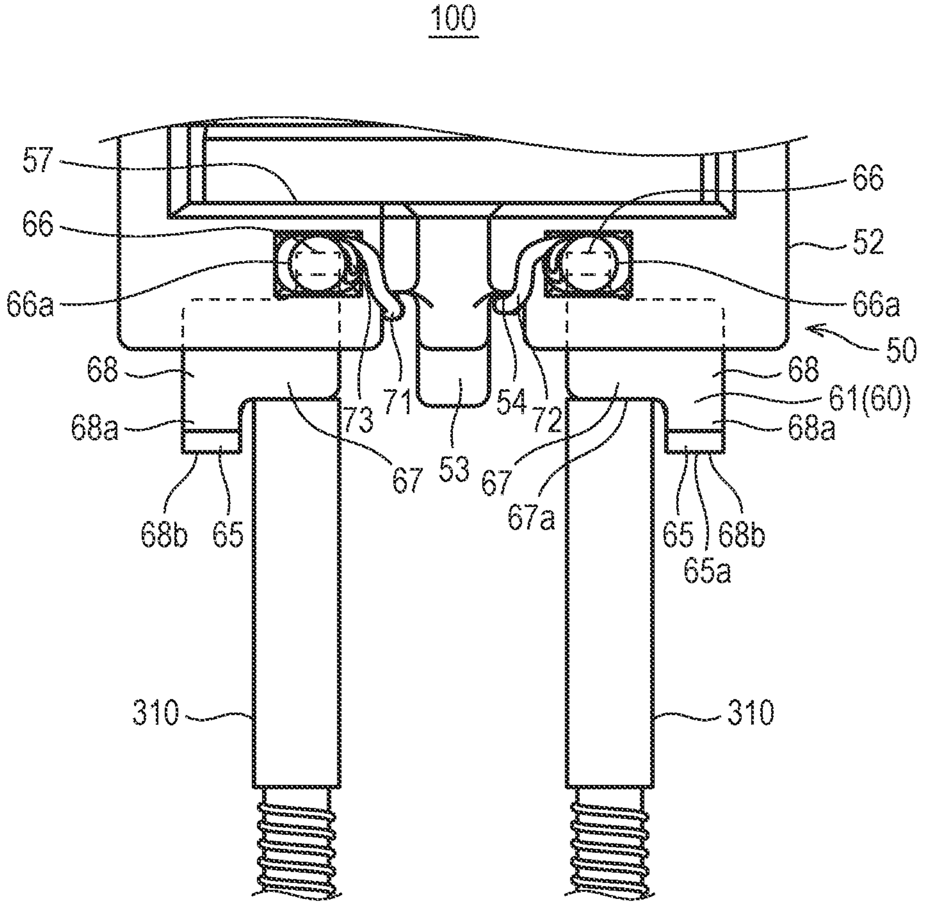
FIG. 8 is a front elevation of the terminal members and a peripheral structure thereof in the embodiment, with contact probes pressed against standoff parts.

In more detail, as illustrated in FIG. 8, each contact probe 310 extends perpendicularly. With this design, when applying electric current to the coil 70, tips of the contact probes 310 may be contacted evenly with the lower faces 67*a* of the standoff parts 67. The standoff parts 67 can therefore maintain proper shape, even if the tips of the contact probes 310 were strongly pressed against the lower faces 67*a* of the standoff parts 67. This enables highly reproducible inspection of electrical characteristics when repeated.

The lower face 67*a* of the standoff part 67 is formed oblong in one horizontal direction.

With this design, the lower face 67*a* of the standoff part 67 will have a sufficiently large dimension in the horizontal direction, thus allowing the tips of the contact probes 310 to properly contact with the lower face 67*a* of the standoff part 67.

This also allows use of the contact probes 310 having the tips with larger outer diameter, enabling application of larger electric current for longer time to the coil component 100. This enables actual operation test with use of a current transformer, ageing test, and detection of joint failure of terminal member 60 on the basis of drop voltage measurement.

As illustrated in FIG. 4, a part of the terminal member 60, which protrudes from the terminal holder 50, contains a tying-up terminal part 66 on which an end of the coil 70 is tied up and electrically connected.

The tying-up terminal part 66 and the mounting terminal part 65 are arranged at different positions in a plan view.

Hence, even in a process of fixing the end of the coil 70 on the tying-up terminal part 66, such structure can prevent any flux used for soldering, or sooth that generates during laser welding, from adhering to the mounting terminal part 65. As a consequence, performances of the coil component 100 may properly maintained in a more reliable manner.

As illustrated typically in FIG. 1, FIG. 4 and FIG. 5, the terminal member 60 typically has an L-shaped part that contains an upper extended part that extends upwards from the upright plate part 68, and a second horizontally extended part that extends nearly horizontally from the upper end part of the upper extended part, wherein the second horizontally extended part constitutes the tying-up terminal part 66.

In this embodiment, as illustrated in FIG. 4 and FIG. 5, the direction of protrusion of the tying-up terminal part 66 and the direction of protrusion of the mounting terminal part 65 are the same. Meanwhile, as illustrated in FIG. 7B, the tying-up terminal part 66 and the mounting terminal part 65 are arranged offset from each other in the horizontal direction, when viewed from the frontmost side in the direction of protrusion of the tying-up terminal part 66 and the mounting terminal part 65.

In more detail, as illustrated in FIG. 7B and FIG. 7C, the upright plate part 68 is typically formed in the shape of near-rectangular flat plate. The upright plate part 68 is typically arranged perpendicularly. Each of the upper end face and the lower end face of the upright plate part 68 are typically arranged horizontally. The face of the upright plate part 68 is typically directed in the front-and-rear direction.

The down-extended part 68*a* is typically formed at one end of the lower end face of the upright plate part 68 in the left-and-right direction. The mounting terminal part 65 (horizontally extended part 68*b*) typically protrudes in one direction orthogonal to the face of the upright plate part 68. The lower face 65*a* of the mounting terminal part 65 is arranged below the lower end face of the upright plate part 68.

Note, however, that the down-extended part 68*a* may typically be formed at a center part, in the left-and-right direction, of the lower end face of the upright plate part 68.

The upper extended part is typically formed at the upper end face of the upright plate part 68, on the side in the left-and-right direction opposite to the side the down-extended part 68*a* is formed. The tying-up terminal part 66 (second horizontally extended part) typically protrudes in a direction same as the direction of protrusion of the mounting terminal part 65. The upper face of the tying-up terminal part 66 is arranged above the upper end face of the upright plate part 68.

As illustrated in FIG. 7C and FIG. 7D, end face (tip in the direction of protrusion) of the mounting terminal part 65 and the end face (tip in the direction of protrusion) of the tying-up terminal part 66 are typically formed flush with each other.

Each terminal member 60 typically has a part embedded in the terminal holder 50, and a part not embedded therein, wherein the embedded part corresponds to an upper part of the upright plate part 68, an upper extended part that extends upwards from the upright plate part 68, and a base end part (end part on a side opposite to the direction of protrusion) of the tying-up terminal part 66. A lower part of the upright plate part 68 of each terminal member 60 exposes downwards from the lower face of the terminal holder 50.

The standoff part 67 in this embodiment is typically a part (lower part) of the upright plate part 68, which exposes downwards from the terminal holder 50. The lower face (lower end face) 67*a* of the standoff part 67 is typically a region of the lower end face of the upright plate part 68 where the down-extended part 68*a* is not formed. Since the upright plate part 68 is thus embedded in the terminal holder 50, and a part of the upright plate part 68 constitutes the standoff part 67, so that the standoff part 67 is structurally suppressed from deforming due to force applied from below. Hence, the standoff part 67 can properly maintain the shape even if the lower face 67*a* thereof is strongly pressurized with the contact probes 310.

As illustrated in FIG. 7C, lengthwise dimension (dimension in the direction of protrusion) of the mounting terminal part 65 is set equivalent to the lengthwise dimension (dimension in the direction of protrusion) of the tying-up terminal part 66. Meanwhile, the widthwise dimension (dimension in the left-and-right direction) of the mounting terminal part 65 is typically set larger than the widthwise dimension (dimension in in the left-and-right direction) of the tying-up terminal part 66.

As illustrated in FIG. 7B, FIG. 7C and FIG. 7D, the dimension in the left-and-right direction of the upright plate part 68 is typically set larger than the widthwise dimension (dimension in the left-and-right direction) of the mounting terminal part 65.

Hence, the upright plate part 68 will have sufficient structural strength, and can therefore maintain proper shape even if strongly pressurized with the contact probes 310. This also suppresses any stress from being concentrated at a boundary between the standoff part 67 and the mounting terminal part 65 (down-extended part 68*a*), even if impact or vibration were applied to the coil component 100. Hence, the terminal member 60 can maintain the shape in a more reliable manner.

Difference of levels of height between the lower face 67*a* of the standoff part 67, and the lower face 65*a* of the mounting terminal part 65 is typically smaller than the length of protrusion of the mounting terminal part 65.

Hence, the mounting terminal part 65 can stably support a part, above the mounting terminal part 65, of the coil component 100, and can therefore improve durability of the coil component 100 against vibration.

In one example, of four terminal members 60, two terminal members 60 (referred to as a pair of first terminal members 61, hereinafter) are held by the first terminal holder 52, and the residual two terminal members 60 (referred to as a pair of second terminal members 62) are held by the second terminal holder 55.

In more detail, the coil component 100 has, as the pair of first terminal members 61 arranged while placing the center axis of the coil 70 in between, the first terminal member 61 arranged on the right side and the first terminal member 61 arranged on the left side. Similarly, the coil component 100 has, as the pair of second terminal members 62 arranged while placing the center axis of the coil 70 in between, the second terminal member 62 arranged on the right side, and the second terminal member 62 arranged on the left side.

Now, as illustrated in FIG. 5, the standoff part 67 is preferably arranged more distant in a plan view from a corner 80*a* of the coil component 100, as compared with the mounting terminal part 65.

Since the mounting terminal part 65 is thus arranged on the outer side of the standoff part 67, so that the mounting terminal part 65 can stably support a part, above the mounting terminal part 65, of the coil component 100.

In more detail, the individual terminal members 60 in this embodiment are held by the terminal holders 50 (first terminal holder 52 and the second terminal holder 55), with at least a part of the standoff part 67 positioned in the left-and-right direction closer to the axial center of the coil 70, than the mounting terminal part 65.

Again as illustrated in FIG. 5, the coil component 100 in this embodiment has four corners 80*a* arranged at the front right, front left, rear right, and rear left. Each standoff part 67 is arranged more distant from the nearest corner 80*a* out of the four corners, as compared with the corresponding mounting terminal part 65. That is, the standoff part 67 of the right first terminal member 61 is arranged more distant from the front right corner 80*a*, as compared with the corresponding mounting terminal part 65. Similarly, the standoff part 67 of the left first terminal member 61 is arranged more distant from the front left corner 80*a*, as compared with the corresponding mounting terminal part 65; the standoff part 67 of the right second terminal member 62 is arranged more distant from the rear right corner 80*a*, as compared with the corresponding mounting terminal part 65; and the standoff part 67 of the left second terminal member 62 is arranged more distant from the rear left corner 80*a*, as compared with the corresponding mounting terminal part 65.

As illustrated in FIG. 5, each of the mounting terminal part 65 and the tying-up terminal part 66 of the right first terminal member 61 typically protrudes frontwards. The upright plate part 68 has the down-extended part 68*a* which is formed at the right end part of the lower end face. The mounting terminal part 65 is therefore arranged at the right side of the upright plate part 68. The upright plate part 68 also has the upper extended part which is formed at the left end part of the upper end face. The tying-up terminal part 66 is therefore arranged at the left side of the upright plate part 68.

As illustrated typically in 7A and FIG. 7B, the left first terminal member 61 and the right first terminal member 61 are arranged symmetrically in the left-and-right direction. Hence, the mounting terminal part 65 of the left first terminal member 61 is arranged at the left side of the upright plate part 68, and the tying-up terminal part 66 is arranged at the right side of the upright plate part 68.

For example, the pair of second terminal members 62 are arranged symmetrically about the pair of first terminal members 61 in the front-and-rear direction. Hence, the mounting terminal part 65 and the tying-up terminal part 66 of each second terminal member 62 typically extends rearwards.

The length of protrusion (length L1 denoted in FIG. 3), in the top-and-bottom direction, of the upright plate part 68 (standoff part 67) from the terminal holder 50 is preferably 0.3 mm or longer and 0.9 mm or shorter, and more preferably 0.6 mm or longer and 0.8 mm or shorter, although not specifically limited. With this design, the coil component 100 will have improved durability against vibration.

The dimension (length L2 denoted in FIG. 3) in the top-and-bottom direction of a part, embedded in the terminal holder 50, of the upright plate part 68 is typically 0.5 mm or longer and 1.1 mm or shorter, and more preferably 0.6 mm or longer and 0.8 mm or shorter, although not specifically limited. With this design, the terminal holder 50 can stably hold the upright plate part 68, and consequently the standoff part 67. The standoff part 67 may therefore be suppressed from being deformed. This therefore enables highly reproducible inspection of electrical characteristics when repeated.

Figure 6A:
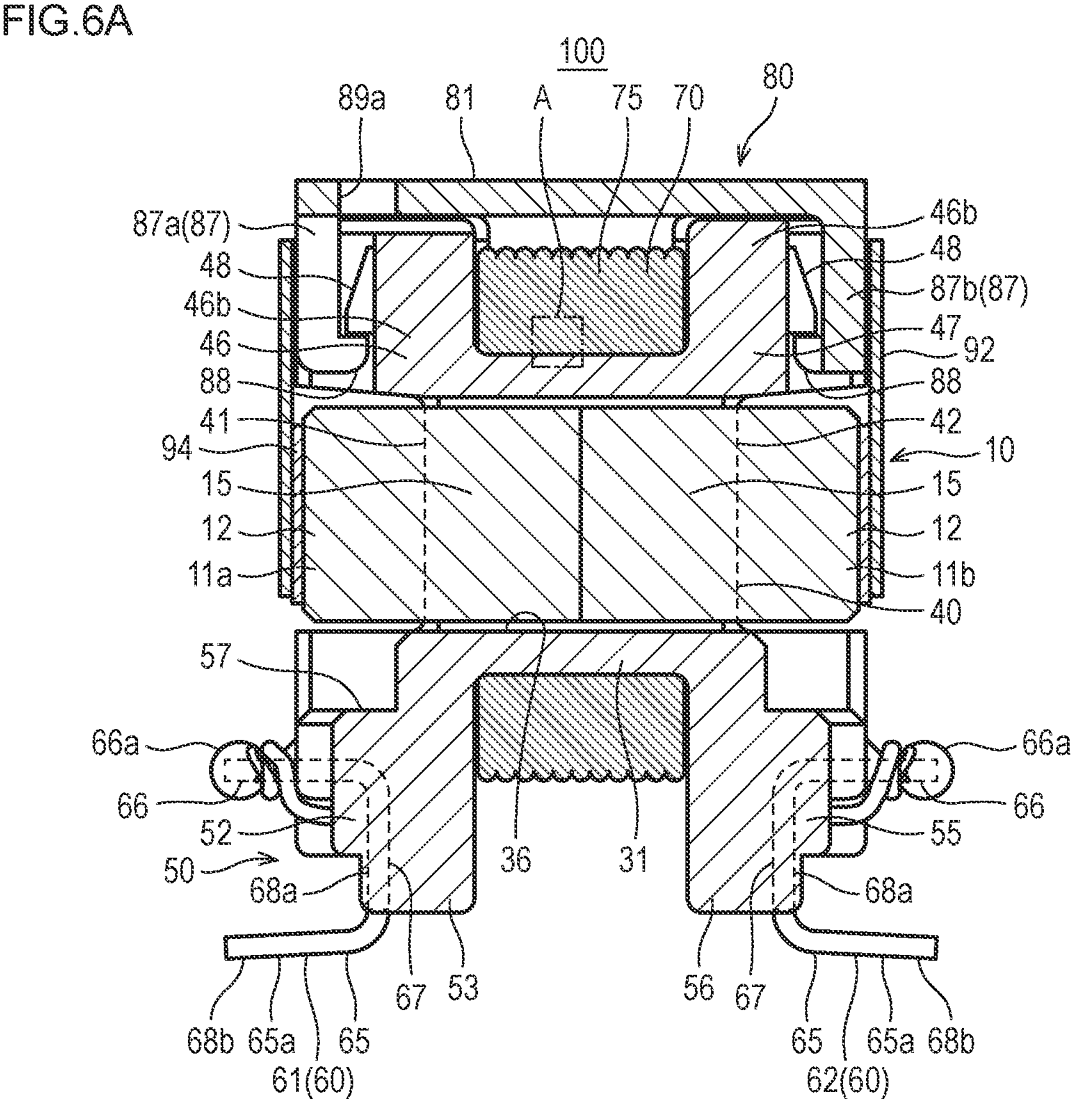
FIG. 6A is a cross-sectional view taken along line A-A in FIG. 5.
Figure 6B:
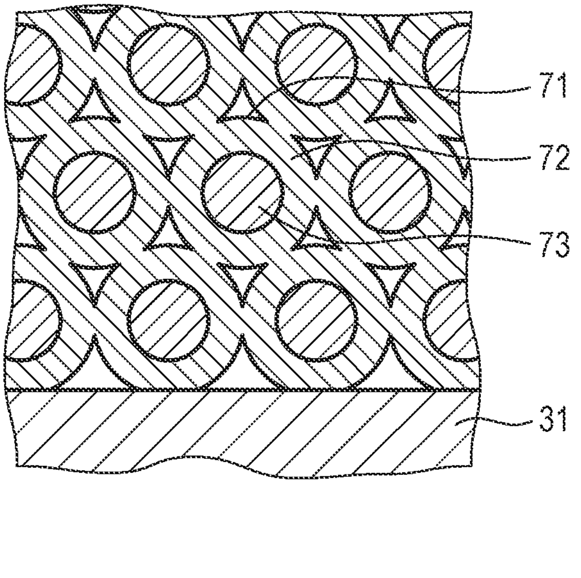
FIG. 6B is a partially enlarged view of part A in FIG. 6A.

As illustrated in FIG. 3, FIG. 6A and FIG. 6B, the coil 70 in this embodiment is typically constituted of a covered wire 71 typically having a resin cover 72, and the coil 70 has a plurality of wound parts 75 wound around the bobbin part 30.

In this embodiment, a position of the front end of the wound part 75 is determined by the rear faces of the first flange 41 and the first protruded part 46, meanwhile a position of the rear end of the wound part 75 is determined by the front faces of the second flange 42 and the second protruded part 47.

In more detail, the coil component 100 in this embodiment typically has, as the coil 70, a first coil and a second coil.

Each of the first coil and the second coil is constituted of the covered wire 71. The covered wire 71 of the coil 70 is wound around a cylinder 31 of the bobbin part 30. The plurality of wound parts 75 (see FIG. 2) is constituted of the covered wire 71 wound around the cylinder 31. As illustrated in FIG. 3, at both ends of each covered wire 71, a metal wire 73 is exposed out from the resin cover 72. With the metal wires 73 at both ends of each covered wire 71 drawn out from the individual wound parts 75 and tied up around the corresponding tying-up terminal parts 66, the coil 70 is electrically connected to the terminal member 60. In this embodiment, both ends of each covered wire 71 are fixed to the mounting terminal part 65 with use of a solder 66*a*.

Note, for example, that a part of the covered wire 71, which is drawn out from the wound part 75 towards the tying-up terminal part 66, may have the resin cover 72 welded to the base member 20. This may improve the strength of the coil component 100 against vibration.

As illustrated in FIG. 6B, the covered wire 71 typically contains a metal wire 73. The resin cover 72 is coated on the outer face of the metal wire 73.

Now, as illustrated in FIG. 6B, the plurality of wound parts 75 in this embodiment are mutually welded while placing the resin cover 72 in between.

This properly maintains the shape of the wound part 75, that is, a wound state of the covered wire 71.

In more detail, as illustrated in FIG. 6B, resin covers 72 of the adjoining wound parts 75 are welded. Note that, in each wound part 75, the metal wire 73 is preferably covered with the resin cover 72 over the entire range. In other words, the metal wire 73 in each wound part 75 is preferably not exposed to the outside of the resin cover 72.

Again as illustrated in FIG. 6B, the plurality of wound parts 75 and the bobbin part 30 in this embodiment are mutually welded while placing the resin cover 72 in between.

This successfully limits the individual wound parts 75 from shifting relative to the bobbin part 30.

In more detail, the resin cover 72 of the wound part 75 wound around the outer circumferential face of the cylinder 31 is welded to the outer circumferential face.

As illustrated typically in FIG. 1, FIG. 2 and FIG. 6, the cover member 80 typically has a top face part 81 that covers a top part of the bobbin part 30. In more detail, the cover member 80 has a first sidewall 82*a* and a second sidewall 82*b* that individually extend downwards from the circumference of the top face part 81, and a down-extended part 84 that extends downwards from the circumference of the top face part 81.

The top face part 81 is typically formed in the shape of flat plate, and is arranged horizontally. As illustrated in FIG. 5, the top face part 81 typically has a nearly rectangular shape in a plan view. The front left corner of the top face part 81 is partially notched to give a notched part. The notched part enables easy recognition of directionality of the cover member 80.

Provision of the top face part 81 to the cover member 80 enables a mounter, used when mounting the coil component 100 on a board, to adsorb the top face part 81, making it easier to mount the coil component 100 on a board. Note, however, that the top face part 81 is not always necessarily formed flat.

Each of the first sidewall 82*a* and the second sidewall 82*b* is formed in the shape of flat plate, and is arranged perpendicularly.

The first sidewall 82*a* typically extends downwards from the bottom face of a right side end of the top face part 81, meanwhile, the second sidewall 82*b* extends downwards from the bottom face of a left side end of the top face part 81. As illustrated in FIG. 5, the first sidewall 82*a* and the second sidewall 82*b* are opposed with each other in the left-and-right direction.

The right side face of the first sidewall 82*a* is arranged flush with the right side face of the top face part 81, meanwhile the left side face of the second sidewall 82*b* is arranged flush with the left side face of the top face part 81.

The down-extended part 84 is typically formed in the shape of flat plate, and arranged perpendicularly. The down-extended part 84 typically extends downwards from a center part, in the front-and-rear direction, of the rear end part of the top face part 81. The rear face of the down-extended part 84 is formed flush with the rear end face of the top face part 81.

Each of the first magnetic core 11*a* and the second magnetic core 11*b* is integrally formed entirely with use of a magnetic material.

The base member 20 (bobbin part 30 and terminal holder 50) is, for example, integrally formed with use of an insulating material such as resin.

The cover member 80 is, for example, integrally formed with use of an insulating material such as resin, over the entire range thereof.

The cover member 80 in this embodiment is fitted to the bobbin part 30, so as to cover the top end of the bobbin part 30. In more detail, as illustrated typically in FIG. 2, FIG. 3 and FIG. 6A, the top face part 81 covers the top part of the bobbin part 30, the first sidewall 82*a* covers the top right part of the bobbin part 30, and the second sidewall 82*b* covers the top left part of the bobbin part 30.

As illustrated in FIG. 6A, the inner face (lower face) of the top face part 81, and each of the upper end face of the first protruded part 46 and the upper end face of the second protruded part 47 are typically brought into surface contact. Note however that the inner face of the top face part 81, and each of the upper end face of the first protruded part 46 and the upper end face of the second protruded part 47 may be opposed in close proximity.

As illustrated in FIG. 3, the inner face of the first sidewall 82*a* is preferably arranged in parallel to each of the right side face of the first flange 41 and the right side face of the second flange 42. The inner face of the second sidewall 82*b* is preferably arranged in parallel to each of the left side face of the first flange 41 and the left side face of the second flange 42.

The insertion part 15 of the first magnetic core 11*a* is inserted through an opening on the front side of the insertion hole 36 of the bobbin part 30, into the insertion hole 36 (see FIG. 6A). Similarly, the insertion part 15 of the second magnetic core 11*b* is inserted through an opening on the rear side of the insertion hole 36 of the bobbin part 30, into the insertion hole 36.

The end face of the insertion part 15 of the first magnetic core 11*a* and the end face of the insertion part 15 of the second magnetic core 11*b* are abutted inside the insertion hole 36. That is, the end face of the insertion part 15 of the first magnetic core 11*a* and the end face of the insertion part 15 of the second magnetic core 11*b* are brought into surface contact with each other.

The first magnetic core 11*a* and the second magnetic core 11*b* thus form a closed magnetic circuit.

Note, as illustrated in FIG. 6A, since the bobbin part 30 has the coil 70 wound therearound, and the bobbin part 30 also has the insertion part 15 inserted therethrough, so that the coil 70 is understood to be wound around the magnetic core 10.

As illustrated in FIG. 3 and FIG. 4, the left and right outer legs 13 of the first magnetic core 11*a* are arranged outside the bobbin part 30. The inner face of the right outer leg 13 is opposed to each of the right side face of the first flange 41 and the right side face of the second flange 42, meanwhile the inner face of the left outer leg 13 is opposed to each of the left side face of the first flange 41 and the left side face of the second flange 42. The base 12 of the first magnetic core 11*a* is arranged on the front side of the bobbin part 30, and the inner face of the base 12 is opposed to the front face of the first flange 41.

In more detail, the left and right outer legs 13 of the second magnetic core 11*b* are arranged outside the bobbin part 30. The inner face of the right outer leg 13 is opposed to each of the right side face of the first flange 41 and the right side face of the second flange 42, meanwhile the inner face of the left outer leg 13 is opposed to each of the left side face of the first flange 41 and the left side face of the second flange 42. The base 12 of the second magnetic core 11*b* is arranged on the rear side of the bobbin part 30, and the inner face 12*a* of the base 12 is opposed to the rear face of the second flange 42.

The end face of the right outer leg 13 of the first magnetic core 11*a* and the end face of the right outer leg 13 of the second magnetic core 11*b* are abutted. That is, the end face of the right outer leg 13 of the first magnetic core 11*a*, and the end face of the right outer leg 13 of the second magnetic core 11*b* are brought into surface contact with each other. Similarly, the end face of the left outer leg 13 of first magnetic core 11*a*, and the end face of the left outer leg 13 of second magnetic core 11*b* are abutted with each other.

The lower face of the insertion part 15 is arranged along the bottom inner circumferential face of the insertion hole 36.

As illustrated in FIG. 6A, the lower faces of the first magnetic core 11*a* and the second magnetic core 11*b* are mutually arranged on the same plane.

The base 12 of the first magnetic core 11*a* is arranged on the upper side of the first terminal holder 52, and is arranged along the top face of the first terminal holder 52.

The base 12 of the second magnetic core 11*b* is arranged on the upper side of the second terminal holder 55, and is arranged along the top face of the second terminal holder 55. The lower faces of the first magnetic core 11*a* and the second magnetic core 11*b*, and the top face of the terminal holder 50 (first terminal holder 52 and the second terminal holder 55) may be brought into surface contact, of may be opposed in close proximity.

Now, the cover member 80 in this embodiment has second down-extended parts 87 that extend downwards from the circumference of the top face part 81, and each second down-extended part 87 has a fitting claw 88. As illustrated in FIG. 6A, the fitting claw 88 engages with the bobbin part 30.

This successfully keeps the cover member 80 properly fitted to the bobbin part 30.

In more detail, the cover member 80 has the pair of left-and-right second down-extended parts 87*a* (see FIG. 2) that are arranged on the front side of the bobbin part 30, and the pair of left-and-right second down-extended parts 87*b* (see FIG. 2) that are arranged on the rear side of the bobbin part 30.

As illustrated in FIG. 6A, each of the pair of second down-extended parts 87*a* on the front side extends downwards from the front edge of the lower face of the top face part 81. Each of the pair of second down-extended parts 87*a* on the front side typically engages with the first protruded part 46 of the bobbin part 30.

Each of the pair of second down-extended parts 87*b* on the rear side protrudes downwards from the rear edge of the lower face of the top face part 81. Each of the pair of second down-extended parts 87*b* on the rear side typically engages with the second protruded part 47 of the bobbin part 30.

Since, in this structure, both of the second down-extended parts 87*a* on the front side and the second down-extended parts 87*b* on the rear side engage with the bobbin part 30 with the aid of such engagement structure, so that the cover member 80 may be limited from shifting relative to the bobbin part 30 in the front-and-rear direction.

Also since two second down-extended parts 87 (second down-extended parts 87*a* and the second down-extended part 87*b*) are arranged side by side in the left-and-right direction, the cover member 80 may be limited from shifting around the Z-axis relative to the bobbin part 30.

Each of the pair of second down-extended parts 87*a* typically has a flat plate part that is formed in the shape of flat plate whose plate face is directed in the front-and-rear direction. The front end face of each flat plate part of the pair of second down-extended parts 87*a* is typically arranged flush with the front end face of the top face part 81.

As illustrated in FIG. 5 and FIG. 6A, the fitting claw 88 of each of the pair of second down-extended parts 87*a* typically extends from the rear end face of the flat plate part, towards the bobbin part 30 (rearwards). The upper face of the fitting claw 88 is formed flat, and arranged horizontally. On the other hand, a part of the lower end part of the fitting claw 88 is rounded. An apical face 88*a* (tip in the direction of protrusion) of the fitting claw 88 is formed flat, and arranged perpendicularly.

Also as illustrated in FIG. 5, the top face part 81 has formed therein a first slit 89*a* that extends therethrough in the top-and-bottom direction. The first slit 89*a* extends nearly straight in the left-and-right direction. The first slit 89*a* is juxtaposed in the front-and-rear direction with the flat plate parts of the pair of second down-extended parts 87*a*, and is arranged on the front side of the flat plate parts.

As illustrated typically in FIG. 1 and FIG. 2, each of the pair of left-and-right second down-extended parts 87*b* is typically formed symmetrically about each of the pair of left-and-right second down-extended parts 87*a*, in the front-and-rear direction. That is, each of the pair of the second down-extended parts 87*b* has a flat plate part, and the fitting claw 88 that protrudes frontwards from the front end face of the flat late part. The rear end face of the flat plate part of each of the pair of second down-extended parts 87*b* is arranged flush with the rear end face of the top face part 81.

Note that, as illustrated in FIG. 2, each of the second down-extended parts 87*b* on the rear side is typically formed at the front edge part of the top face part 81, on the right and on the left in the left-and-right direction, while placing the down-extended part 84 in between. In other words, the down-extended part 84 is arranged between the right second down-extended part 87*b* and the left second down-extended part 87*b*.

As illustrated in FIG. 1, FIG. 2 and FIG. 5, the top face part 81 has formed therein the pair of left-and-right second slits 89*b* that extend through the top face part 81 in the top-and-bottom direction. Each of the pair of second slits 89*b* extends nearly straight in the left-and-right direction. The right second slit 89*b* is juxtaposed with the flat plate part of the right second down-extended parts 87*b* in the front-and-rear direction, and is arranged on the rear side of the flat plate part. Similarly, the left second slit 89*b* is juxtaposed with the flat plate part of the left second down-extended part 87*b* in the front-and-rear direction, and is arranged on the rear side of the flat plate part.

Now, as illustrated in FIG. 2, FIG. 5 and FIG. 6A, the connection part 46*b* of the first protruded part 46 has formed thereon a pair of left-and-right engagement parts 48 with which the pair of second down-extended parts 87*a* on the front side engage.

The engagement part 48 on the right is formed in the right side end part on the front face of the connection part 46*b*, meanwhile the engagement part 48 on the left is formed in the left side end part on the front face of the connection part 46*b*.

Each engagement part 48 typically protrudes frontwards from the front face of the connection part 46*b*. In more detail, the upper part of each engagement part 48 has a tapered shape whose amount of protrusion from the front face of the connection part 46*b* increases downwards, meanwhile the lower part of each engagement part 48 has a constant amount of protrusion from the front face of the connection part 46*b*.

The lower face of the lower part of each engagement part 48 is typically formed flat, and arranged horizontally.

As illustrated in FIG. 3, every single fitting claw 88 of the second down-extended part 87*a* engages with each engagement part 48. When out-fitting the cover member 80 onto the bobbin part 30, the pair of second down-extended parts 87*a* are guided along the upper parts of the corresponding engagement parts 48 towards the lower parts of the engagement parts 48.

The length of protrusion (front-and-rear dimension) of the lower part of the engagement part 48 is typically set slightly smaller than the length of protrusion (front-and-rear dimension) of the fitting claw 88. In the top-and-bottom direction, the level of height of the lower face of the lower part of the engagement part 48 is set nearly equivalent to the level of height of the upper face of the fitting claw 88. In the front-and-rear direction, the front end face of the lower part of the engagement part 48 is opposed to a part of the rear end face of the flat plate part of the second down-extended part 87*a*.

Meanwhile, as illustrated in FIG. 5, in the left-and-right direction, the left side face of the right square block part 46*a*, and the right side face of the right second down-extended part 87*a* are opposed to each other. This successfully limits the right second down-extended part 87*a* from shifting rightwards from the corresponding square block part 46*a* in the left-and-right direction. Similarly, in the left-and-right direction, the right side face of the left square block part 46*a* and the left side face of the left second down-extended part 87*a* are opposed to each other. This successfully limits the left second down-extended part 87*a* from shifting leftwards from the corresponding square block part 46*a* in the left-and-right direction. That is, engagement of the fitting claw 88 with the engagement part 48 may be properly maintained.

Similarly, as illustrated in FIG. 2, FIG. 5, FIG. 6 and FIG. 7, the front face of the connection part 46*b* of the second protruded part 47 has, formed therein the pair of left-and-right engagement parts 48 with which the pair of left-and-right second down-extended parts 87*b* individually engage.

Each engagement part 48 on the second protruded part 47 side is typically formed nearly symmetrically about each engagement part 48 on the first protruded part 46 side, in the front-and-rear direction. Hence, each engagement part 48 on the second protruded part 47 side protrudes rearwards from the rear face of the connection part 46*b* of the second protruded part 47.

Every single second fitting claw 88 of the down-extended part 87*b* engages with each engagement part 48. When out-fitting the cover member 80 onto the bobbin part 30, the pair of second down-extended parts 87*b* are guided along the upper parts of the corresponded engagement parts 48 towards the lower parts of the engagement parts 48. The lower face of the lower part of the engagement part 48 is brought into surface contact with the upper face of the fitting claw 88. The apical face 88*a* of the fitting claw 88 is brought into surface contact with the second side face 42*a*.

As illustrated in FIG. 4, the left side face of the right square block part 46*a* and the right side face of the right second down-extended part 87*b* are opposed to each other in the left-and-right direction. This successfully limits the right second down-extended part 87*a* from shifting rightwards from the corresponding square block part 46*a*, in the left-and-right direction. Similarly, the right side face of the left square block part 46*a* and the left side face of the left second down-extended part 87*b* are opposed to each other in the left-and-right direction. This successfully limits the left second down-extended part 87*b* from shifting leftwards from the corresponding square block part 46*a*, in the left-and-right direction. That is, engagement of the fitting claw 88 with the engagement part 48 may be properly maintained.

Now, the coil component 100 in this embodiment has a first fixation tape 94 (see FIG. 1 and FIG. 5) wound around the magnetic core 10. With the first fixation tape 94, the individual insertion parts 15 of the first magnetic core 11*a* and the second magnetic core 11*b* are properly kept inserted in the insertion hole 36 of the bobbin part 30. Note that FIG. 2, FIG. 3 and FIG. 4 do not illustrate the first fixation tape 94.

In more detail, as illustrated in FIG. 4, the first fixation tape 94 is typically wound around the outer side face of the base 12 of the second magnetic core 11*b*, the outer face of the front outer leg 13 of the second magnetic core 11*b*, the outer face of the front outer leg 13 of the first magnetic core 11*a*, the outer side face of the base 12 of the first magnetic core 11*a*, the outer face of the rear outer leg 13 of the first magnetic core 11*a*, the outer face of the rear outer leg 13 of the second magnetic core 11*b*, and, again the outer side face of the base 12 of the second magnetic core 11*b*.

The first fixation tape 94 in this embodiment is formed in the shape of belt which is oblong in one direction. The first fixation tape 94 may be an adhesive tape having an adhesive layer preliminarily formed thereon, or may be a band-like member which is adhered with use of an adhesive when assembling the coil component 100.

The coil component 100 in this embodiment further has a second fixation tape 92 (see FIG. 1 and FIG. 5) wound both around the magnetic core 10 and the cover member 80. With the second fixation tape 92, the magnetic core 10 is properly fixed both to the bobbin part 30 and the cover member 80. Note that FIG. 2, FIG. 3 and FIG. 4 do not illustrate the second fixation tape 92.

In more detail, as illustrated in FIG. 4 and FIG. 6, the second fixation tape 92 is typically wound around the entire outer circumference of the first fixation tape 94, the outer face of the first protruded part 46, the outer face of the second protruded part 47, the outer face of the first sidewall 82*a*, and the outer face of the second sidewall 82*b*.

The second fixation tape 92 in this embodiment is formed in the shape of belt which is oblong in one direction. The second fixation tape 92 may be an adhesive tape having an adhesive layer preliminarily formed thereon, or may be a band-like member which is adhered with use of an adhesive when assembling the coil component 100. As illustrated in FIG. 6, a lower part of the second fixation tape 92 is wound around the first fixation tape 94.

The top-and-bottom dimension of the first fixation tape 94 is typically set nearly equivalent to the top-and-bottom dimension of the magnetic core 10. The top-and-bottom dimension of the second fixation tape 92 is typically larger than the top-and-bottom dimension of the magnetic core 10, and smaller than the top-and-bottom dimension of the cover member 80.

The coil component 100 of this embodiment is constituted as described above. Such coil component 100 is typically applicable to a high voltage pulse transformer. Application of the coil component 100 is, however, not limited thereto.

The coil component 100 may typically be assembled as below.

First, each covered wire 71 of the coil 70 (the first coil and the second coil) is wound around the cylinder part 31 of the bobbin part 30. Ends of each covered wire 71 are tied up with tying-up terminals 66 of the corresponding terminal members 60, and then fixed by welding or soldering.

Next, the insertion part 15 of the first magnetic core 11*a* is inserted through the front opening of the insertion hole 36 into the insertion hole 36, and the insertion part 15 of the second magnetic core 11*b* is inserted through the rear opening of the insertion hole 36 into the insertion hole 36.

Next, the cover member 80 is capped from above the bobbin part 30. In this process for example, the fitting claw 88 of each second down-extended part 87 is first arranged along the upper part of the corresponding engagement part 48. The cover member 80 is then pressed down against the base member 20, until the fitting claw 88 of each second down-extended part 87 comes into engagement with the corresponding engagement part 48. In this process, the fitting claw 88 of the second down-extended part 87 slides downwards along the inclined face of the upper part of the corresponding engagement part 48, and reaches the lower face of the lower part of the engagement part 48.

The cover member 80 is thus out-fitted on the bobbin part 30.

Next, the first fixation tape 94 is wound around the magnetic core 10 at least one turn or more. The magnetic core 10 may thus be fixed to the bobbin part 30. The second fixation tape 92 is then wound both around the first fixation tape 94 and the cover member 80 at least one turn or more. The magnetic core 10 may thus be fixed to the cover member 80 and the bobbin part 30 in a more reliable manner.

Next, electric current is applied to the coil component 100 to heat the coil 70. Heat generated from the coil 70 melts the resin cover 72 of the covered wire 71, and can fuse the adjoining resin covers 72 in the wound part 75. This also melts the resin cover 72 of the wound part 75 wound around the outer circumference of the cylinder 31, and welds the resin cover 72 to the outer circumference. That is, the coil 70 and the bobbin part 30 may be welded with each other.

Now, as has been described above, the coil component 100 in this embodiment has the standoff part 67 that is arranged at a position different, in a bottom view, from the mounting terminal part 65, and exposes to the lower face side of the coil component 100. This enables, as illustrated in FIG. 8, the tips of the contact probes 310 to contact to the lower faces 67*a* of the corresponding standoff parts 67, and to apply electric current to the coil component 100.

The shape of the mounting terminal parts 65 and performances of the coil component 100 are therefore unlikely to be damaged, as compared with a case where electric current is applied through the mounting terminal part, enabling application of electric current to the coil component 100 over a longer duration of time. Also larger electric current may be applied to the coil component 100. The coil 70 may thus be heated sufficiently, making it possible to more reliably weld the coil 70 and the bobbin part 30 with each other.

Note that timing of heating of the coil 70 is not specifically limited, and may only be at least after winding of the covered wire 71 around the coil component 100. Alternatively, the coil 70 may be heated during inspection of electrical characteristics, to melt the resin cover 72 as a consequence.

The coil component 100 may be thus obtained.

Having described the individual embodiments referring to the drawings merely as illustrative ones, the present disclosure may employ various structure other than those described above.

Although having described the case where the magnetic core 10 is composed of two E-cores, the present disclosure is not limited to the case, wherein the magnetic core 10 may have an E-core and an I-core in the structure thereof.

The magnetic core 10 may still alternatively have two T-cores, or may have a T-core and the I-core. The magnetic core 10 in this case will have an H-shape as a whole in a plan view.

Although having described the case where the magnetic core 10 has two members (the first magnetic core 11*a* and the second magnetic core 11*b*), the magnetic core 10 may alternatively be an integrated body as a whole, or may be constituted by three of more members.

Having described the case where the coil component 100 has the standoff part 67, the present disclosure is however not limited thereto, wherein the coil component 100 need not have the standoff part 67. Even in this case, the shape of the wound part 75, or a wound state of the covered wire 71, may properly be maintained, since the plurality of wound parts 75 are mutually welded while placing the resin cover 72 in between.

In short, the present disclosure may be a coil component that includes: the base member 20 made of a resin, having the bobbin part 30 and the terminal holder 50; the coil 70 wound around the bobbin part 30; and the plurality of terminal members 60 made of a metal, being held by the terminal holder 50 while being partially embedded therein, and each having the coil 70 electrically connected thereto, wherein a part of each terminal member 60, which protrudes out from the terminal holder 50, includes the mounting terminal part 65, the coil 70 is constituted of a covered wire 71 having a resin cover 72, the coil 70 has the plurality of wound parts 75 wound around the bobbin part 30, and the plurality of wound parts 75 are mutually welded while placing the resin cover 72 in between.

Again in this case, the coil component 100 may have the plurality of wound parts 75 and the bobbin part 30 mutually welded while placing the resin cover 72 in between.

This embodiment encompasses technical spirits below.

(1) A coil component that includes:

a base member made of a resin, having a bobbin part and a terminal holder;

a coil wound around the bobbin part; and a plurality of terminal members made of a metal, being held by the terminal holder while being partially embedded therein, and each having the coil electrically connected thereto, a part of each terminal member, which protrudes out from the terminal holder, including:

a mounting terminal part; and a standoff part that is arranged at a position different, in a bottom view, from the mounting terminal part, and exposes to the lower face side of the coil component.

(2) The coil component according to (1), wherein a lower face of the standoff part is arranged at a level of height higher than a lower face of the mounting terminal part.

(3) The coil component according to (1) or (2), wherein the lower face of the standoff part is arranged horizontally.

(4) The coil component according to any one of (1) to (3), wherein the lower face of the standoff part is formed oblong in one horizontal direction.

(5) The coil component according to (4), wherein each terminal member has an upright plate part that stands upright relative to a mounting face, at least a part of the upright plate part, arranged at a position different, in a bottom view, from the mounting terminal part constitutes the standoff part, and at least a part of a lower end face of the upright plate part constitutes a lower face of the standoff part.

(6) The coil component according to (5), wherein each terminal member has, an L-shaped part containing a down-extended part that extends downwards from the upright plate part, and a horizontally extended part that extends nearly horizontally from a lower end part of the down-extended part, and the horizontally extended part constitutes the mounting terminal part.

(7) The coil component according to any one of (1) to (6), wherein a part of each terminal member, which protrudes from the terminal holder, has a tying-up terminal part on which an end of the coil is tied up and electrically connected, and, the tying-up terminal part and the mounting terminal part are arranged at different positions in a plan view.

(8) The coil component according to any one of (1) to (7), wherein the coil is constituted of a covered wire having a resin cover, the coil has a plurality of wound parts wound around the bobbin part, and the plurality of wound parts are mutually welded while placing the resin cover in between.

(9) The coil component according to any one of (1) to (8), wherein the coil is constituted of a covered wire having a resin cover, the coil has a plurality of wound parts wound around the bobbin part, and the plurality of wound parts and the bobbin part are mutually welded while placing the resin cover in between.

(10) The coil component according to any one of (1) to (9), wherein the standoff part is arranged, in a plan view, more distant from a corner of the coil component, as compared with the mounting terminal part.

(11) A coil component comprising:

a base member made of a resin, having a bobbin part and a terminal holder;

a coil wound around the bobbin part; and a plurality of terminal members made of a metal, being held by the terminal holder while being partially embedded therein, and each having the coil electrically connected thereto, a part of each terminal member, which protrudes out from the terminal holder, includes a mounting terminal part, the coil being constituted of a covered wire having a resin cover, the coil having a plurality of wound parts wound around the bobbin part, and the plurality of wound parts being mutually welded while placing the resin cover in between.

(12) The coil component according to (11), wherein the plurality of wound parts and the bobbin part are mutually welded while placing the resin cover in between.

The invention claimed is:

1. A coil component comprising:

a base member made of a resin, the base member having a bobbin part and a terminal holder;

a coil configured by winding a wire around the bobbin part; and a plurality of terminal members made of a metal, the plurality of terminal members being held by the terminal holder while being partially embedded therein, each of the plurality of terminal members being electrically connected to the coil, wherein a part of each of the plurality of terminal members, which protrudes out from the terminal holder, is configured with:

a mounting terminal part; and a standoff part which is located at a position different from the mounting terminal part in a bottom view and exposes to a lower face side of the coil component, each of the plurality of terminal members has an upright plate part that stands upright relative to a mounting face, a width in a first direction on a horizontal plane of the upright plate part is larger than a width in the first direction of the mounting terminal part, the upright plate part is configured with an upper part and a lower part, the upper part is embedded in the terminal holder, and the lower part protrudes out from the terminal holder to be exposed to a lower face of the terminal holder, at least a part of the lower part of the upright plate part, which is located at a position different from the mounting terminal part along the first direction in the bottom view, constitutes the standoff part, at least a part of a lower end face of the upright plate part constitutes a lower face of the standoff part, and the lower face of the standoff part has a longitudinal structure elongated along the first direction.

2. The coil component according to claim 1, wherein the lower face of the standoff part is arranged at a level of height higher than a lower face of the mounting terminal part.

3. The coil component according to claim 1, wherein the lower face of the standoff part is arranged horizontally.

4. The coil component according to claim 2, wherein the lower face of the standoff part is arranged horizontally.

5. The coil component according to claim 1, wherein each terminal member of the plurality of terminal members has, an L-shaped part containing a down-extended part that extends downwards from the upright plate part, and a horizontally extended part that extends nearly horizontally from a lower end part of the down-extended part, and the horizontally extended part constitutes the mounting terminal part.

6. The coil component according to claim 1, wherein a part of each of the plurality of terminal members, which protrudes out from the terminal holder, has a tying-up terminal part on which an end of the coil is tied up and electrically connected, and, the tying-up terminal part and the mounting terminal part are arranged at different positions in a plan view.

7. The coil component according to claim 2, wherein a part of each of the plurality of terminal members, which protrudes out from the terminal holder, has a tying-up terminal part on which an end of the coil is tied up and electrically connected, and, the tying-up terminal part and the mounting terminal part are arranged at different positions in a plan view.

8. The coil component according to claim 3, wherein a part of each of the plurality of terminal members, which protrudes out from the terminal holder, has a tying-up terminal part on which an end of the coil is tied up and electrically connected, and, the tying-up terminal part and the mounting terminal part are arranged at different positions in a plan view.

9. The coil component according to claim 1, wherein the coil is formed by winding a resin-covered wire around the bobbin part, the coil is configured with a plurality of wound parts of the resin-covered wire, and the plurality of wound parts are mutually fixed via a fused resin of the resin-covered wire.

10. The coil component according to claim 2, wherein the coil is formed by winding a resin-covered wire around the bobbin part, the coil is configured with a plurality of wound parts of the resin-covered wire, and the plurality of wound parts are mutually fixed via a fused resin of the resin-covered wire.

11. The coil component according to claim 3, wherein the coil is formed by winding a resin-covered wire around the bobbin part, the coil is configured with a plurality of wound parts of the resin-covered wire, and the plurality of wound parts are mutually fixed via a fused resin of the resin-covered wire.

12. The coil component according to claim 1, wherein the coil is formed by winding a resin-covered wire around the bobbin part, the coil is configured with a plurality of wound parts of the resin-covered wire, and the plurality of wound parts and the bobbin part are mutually fixed via a fused resin of the resin-covered wire.

13. The coil component according to claim 2, wherein the coil is formed by winding a resin-covered wire around the bobbin part, the coil is configured with a plurality of wound parts of the resin-covered wire, and the plurality of wound parts and the bobbin part are mutually fixed via a fused resin of the resin-covered wire.

14. The coil component according to claim 1, wherein the standoff part is arranged, in a plan view, more distant from a corner of the coil component, as compared with the mounting terminal part.

15. The coil component according to claim 2, wherein the standoff part is arranged, in a plan view, more distant from a corner of the coil component, as compared with the mounting terminal part.

* * * * *